US 6,711,420 B1

(12) United States Patent
Amerga et al.

(10) Patent No.: US 6,711,420 B1
(45) Date of Patent: Mar. 23, 2004

(54) MODIFIED FINGER ASSIGNMENT ALGORITHM FOR HIGH DATA RATE CALLS

(75) Inventors: Messay Amerga, San Diego, CA (US); Serguei A. Glazko, San Diego, CA (US); Baaziz Achour, San Diego, CA (US)

(73) Assignee: Qualcomm, Incorporated, San Diego, CA (US)

( * ) Notice: Subject to any disclaimer, the term of this patent is extended or adjusted under 35 U.S.C. 154(b) by 0 days.

(21) Appl. No.: 09/398,905

(22) Filed: Sep. 15, 1999

(51) Int. Cl.[7] .................................................. H04B 1/38
(52) U.S. Cl. ................ 455/562.1; 455/513; 455/550.1; 370/431
(58) Field of Search ................................ 455/562, 442, 455/450, 452, 513, 522, 550; 370/342, 351, 431, 437, 441

(56) References Cited

U.S. PATENT DOCUMENTS

| 5,781,583 | A | * | 7/1998 | Bruckert et al. ............ 375/206 |
| 5,987,326 | A | * | 11/1999 | Tiedemann, Jr. et al. ... 455/442 |
| 6,058,107 | A | * | 5/2000 | Love et al. .................. 370/332 |
| 6,069,883 | A | * | 5/2000 | Ejzak et al. ................. 370/335 |
| 6,073,021 | A | * | 6/2000 | Kumar et al. ............... 455/442 |
| 6,151,502 | A | * | 11/2000 | Padovani et al. ........... 455/442 |
| 6,173,007 | B1 | * | 1/2001 | Odenwalder et al. ....... 375/146 |
| 6,175,587 | B1 | * | 1/2001 | Madhow et al. ............ 375/148 |
| 6,307,849 | B1 | * | 10/2001 | Tiedemann, Jr. ............ 455/436 |

FOREIGN PATENT DOCUMENTS

| EP | 0814572 | 12/1997 | ............ H04B/7/26 |
| WO | 9832263 | 7/1998 | ........... H04L/12/00 |

OTHER PUBLICATIONS

Prasad, et al., "An Overview of CDMA Evolution Toward Wideband CDMA", 1998, IEEE Communications Survey, vol. 1 No. 1, pps 2–28.

* cited by examiner

Primary Examiner—Edward F. Urban
Assistant Examiner—Thuan T. Nguyen
(74) Attorney, Agent, or Firm—Philip R. Wadsworth; Charles D. Brown; Howard H. Seo

(57) ABSTRACT

A method of creating a path list for use in finger assignments comprising clearing a list of paths (12), choosing a sector for consideration from an active set of sectors (14), establishing a searcher window around the sector for cosideration (16), and determining up to "n" local maxima stronger than a threshold value (18). If a sector under consideration is transmitting on supplemental channels(19), the method involves artificially biasing the findings of the searcher window by a predetermined value (20). The biasing value may be constant, variable or proportional to the number of supplemental channels on the base station. After the local maxima corresponding to base stations transmitting on supplemental channels have been biased (20), the path lists are created (21).

34 Claims, 6 Drawing Sheets

MODIFIED FINGER ASSIGNMENT ALGORITHM FOR HIGH DATA RATE CALLS

BACKGROUND OF THE INVENTION

1. Field of the Invention

The present invention relates generally to a code division multiple access ("CDMA") communication system and specifically to a finger assignment algorithm in a CDMA system which matches demodulating fingers in a mobile station ("MS") with signal paths from a base station ("BS") or base stations wherein signals received from base stations transmitting on supplemental channels are biased to insure that the MS assigns demodulating fingers to those base stations.

2. Description of the Related Art

The next generation of wireless networks will provide multiple services requiring high data rate transmission and uninterrupted connections. This next generation is often referred to as the "third generation" of CDMA wireless systems. The range of services include text paging, two-way radio connections, internet connectivity using microbrowsers, two-way wireless e-mail capability and wireless modem functionality. The CDMA cellular telephone system offers the capability to provide reliable radio links between a wireless communications device such as a MS and a BS with a much higher data capacity than conventional networks that only support voice service. As an example, in the third generation CDMA wireless systems, radio links supporting high rate (up to 2 Mbps) data transmissions will be established between the MS and the BS to provide multimedia services such as Internet access.

One particularly important feature of CDMA systems for effective third generation wireless communication is the soft handoff, which allows the MS to move smoothly from the coverage of one cell to another without interruption of service to the user. The soft handoff is accomplished by establishing simultaneous communications between the MS and multiple base stations or BS sectors. In a soft handoff, a MS passes to the edge of the coverage area of a serving BS into a new coverage area of a receiving BS. Momentarily, both BS sectors simultaneously communicate with the MS. As the MS passes further into the coverage area of the receiving BS, the server BS stops communicating with the MS. In this manner, there is uninterrupted communication for the user of the MS as the he or she passes from the server cell to the receiving cell. An efficient soft handoff algorithm plays an important role in maintaining the link quality as well as conserving the capacity-related network resources. As the demand to support high rate data services increases, the need to improve the efficiency of the handoff algorithm becomes more critical.

For a third generation system based on CDMA technologies, a highly efficient handoff algorithm is essential to successfully provide the infrastructure to support the new range of services. A conventional protocol for soft handoffs in a CDMA system has been adopted by the Telecommunications Industry Association in the industry standards IS-95, IS-95 A or IS-95 B (collectively "IS-95 A/B") for implementing a CDMA cellular system. A new feature in the IS-95 B standard not found in IS-95 A is the inclusion of Supplemental Code Channels, or supplemental channels within the traffic channels. The traffic channels are the communication path between the MS and the BS used for user voice and signaling traffic. The term traffic channel includes the forward channel from the BS to the MS and the reverse channel from the MS to the BS.

In a code division multiple access (CDMA) cellular telephone system, a common frequency band is used for communication with all base stations in a system. The common frequency band allows simultaneous communication between a MS and more than one BS. Signals occupying the common frequency band are discriminated at the receiving station through the spread spectrum CDMA waveform properties based on the use of a high speed pseudonoise (PN) code. The high speed PN code is used to modulate signals transmitted from the base stations and the mobile stations. Transmitter stations using different PN codes or PN codes that are offset in time produce signals that can be separately received at the receiving station. The high speed PN modulation also allows the receiving station to receive a signal from a single transmitting station where the signal has traveled over several distinct propagation paths.

A signal having traveled several distinct propagation paths is generated by the multipath characteristics of the cellular channel. One characteristic of a multipath channel is the time spread introduced in a signal that is transmitted through the channel. For example, if an ideal impulse is transmitted over a multipath channel, the received signal appears as a stream of pulses. Another characteristic of the multipath channel is that each path through the channel may cause a different attenuation factor. For example, if an ideal impulse is transmitted over a multipath channel, each pulse of the received stream of pulses generally has a different signal strength than other received pulses. Yet another characteristic of the multipath channel is that each path through the channel may cause a different phase on the signal. For example, if an ideal impulse is transmitted over a multipath channel, each pulse of the received stream of pulses generally has a different phase than other received pulses.

In the mobile radio channel, the multipath is created by reflection of the signal from obstacles in the environment, such as buildings, trees, cars and people. In general the mobile radio channel is a time varying multipath channel due to the relative motion of the structures that create the multipath. Therefore, if an ideal impulse is transmitted over the time varying multipath channel, the received stream of pulses would change in time location, attenuation, and phase as a function of the time that the ideal impulse was transmitted.

The multipath characteristic of a channel can result in signal fading. Fading is the result of the phasing characteristics of the multipath channel. A fade occurs when multipath vectors are added destructively, yielding a received signal that is smaller than either individual vector. For example if a sine wave is transmitted through a multipath channel having two paths where the first path has an attenuation factor of X dB, a time delay of $\delta$ with a phase shift of $\Theta$ radians, and the second path has an attenuation factor of X dB, a time delay of $\delta$ with a phase shift of $\Theta+\Pi$ radians, no signal would be received at the output of the channel.

In narrow band modulation systems such as the analog FM modulation employed by conventional radio telephone systems, the existence of multiple paths in the radio channel results in severe multipath fading. As noted above with a wideband CDMA, however, the different paths may be discriminated in the demodulation process. This discrimination not only greatly reduces the severity of multipath fading but provides an advantage to the CDMA system.

The deleterious effects of fading can be mitigated by controlling transmitter power in the CDMA system. A system for BS and MS power control is disclosed in U.S. Pat. No. 5,056,109 entitled "METHOD AND APPARATUS FOR CONTROLLING TRANSMISSION POWER IN A CDMA CELLULAR MOBILE TELEPHONE SYSTEM," issued Oct. 8, 1991, assigned to the Assignee of the present invention. Furthermore the effect of multipath fading can be reduced by communication with multiple base stations using a soft handoff process. A handoff process is disclosed in U.S. Pat. No. 5,101,501 entitled "SOFT HANDOFF IN A CDMA CELLULAR TELEPHONE SYSTEM," issued Oct. 8, 1991, and assigned to the Assignee of the present invention. The disclosure of U.S. Pat. Nos. 5,056,109 and 5,101,501 are incorporated herein by reference.

A method of assigning multiple demodulation elements or fingers in a spread spectrum system is disclosed in U.S. Pat. No. 5,490,165 ("the '165 patent"), which disclosure is incorporated as if fully set forth herein. Accordingly, background information and familiarity with the '165 patent are presumed for the present invention. The '165 patent is assigned to the Assignee of the present invention.

In the '165 patent, the MS using a searcher element scans a window of time offsets around the nominal arrive time of each signal of each BS with which active communication is established. The set of base stations having active communication with the MS is called the Active Set. Each scan produces a survey yielding a list of survey paths that comprises pilot signal strength, time offsets, and corresponding BS pilot offset. The survey paths have corresponding data such as the arrival time, signal strength, and transmitter index for each signal. The searcher element passes the information to a controller. The controller tries to match the time offset of each survey path to the time offset of paths currently being demodulated by the fingers. If there are multiple fingers that match one survey path, all fingers or demodulation elements assigned to that path, except the finger having the strongest signal strength indication, are labeled "free." If a finger exists that does not correspond to a survey path, a survey path entry based on the finger information is added to the list of survey paths.

Next the controller considers the survey paths in order of signal strength with the strongest signal strength survey path being first. If there is no finger assigned to any path in the corresponding sector of the survey path under consideration, the controller attempts to assign a finger to the survey path in the following order. If there is an unassigned or labeled "free" finger, the finger is assigned to the survey path. If no finger is free, the finger having the weakest path that is not the only finger from its BS sector, if any, is re-assigned to the survey path. Finally if the first two cases fail to assign a finger to the survey path, a finger assigned to the weakest path is reassigned to the survey path if the survey path's signal strength is stronger than the signal strength of the weakest finger. This process continues until one re-assignment occurs or until the last criteria fails to re-assign a finger to the survey path under consideration.

If none of the above rules re-assign a finger for the present survey path, the controller considers the survey paths again in order of signal strength with the strongest signal strength survey path being first. If the survey path is not currently assigned to a finger, the controller may assign any unassigned or labeled "free" finger to the survey path under consideration. If there are no unassigned or labeled "free" fingers, the controller may also re-assign a finger that is assigned to the same BS sector as a survey path if the survey path is stronger than the finger. The controller may also re-assign the weakest finger that is assigned to any BS sector having two or more assigned fingers if the survey path is stronger than the finger. Once either of the two above rules causes a re-assignment or both of the above rules for re-assignment fail for the survey path under consideration, the process begins again with a new scan.

The '165 patent uses these steps to ensure BS and sector diversity. Each time a finger or finger is re-assigned, a finite time lapses in which no data is demodulated. Therefore, the prior art to the '165 patent limited the number of finger re-assignments per survey. Comparison ratios are used to create hysteresis in the assignments and thus reduce excessive re-assignment of fingers.

The BS uses a similar but less complicated method to assign the fingers. Because each BS sector receives the same information from a single MS, there is no need to sacrifice the maximum signal level paths to promote diversity. Thus the BS method is based more strictly on signal level while limiting the number of re-assignments per survey similar to the MS method. The BS also uses ratios similar to the mobile station to create hysteresis to reduce excessive re-assignment of fingers.

Under the current IS-95 B specifications, a MS may have up to six sectors in its Active Set. The MS may be receiving data at a higher rate on any or all of these sectors. Due to hardware limitations, however, a MS may not have enough demodulating fingers to track all the paths it detects. Therefore, a MS in a soft handoff during a higher data rate call may ignore base stations transmitting on supplemental channels under the finger assignment algorithm as disclosed in the '165 patent.

The supplemental channel is an optional portion of a forward or reverse traffic channel, which operates in conjunction with a fundamental code channel in the traffic channel and optionally with other supplemental channels to provide higher data rate services. The fundamental code channel is also a portion of the forward or reverse traffic channel which carries a combination of primary data, secondary data, signaling and power control information defined and organized according to the IS-95 B industry standard. The Supplementary Channel transmits a combination of primary data, secondary data, or both, but never signaling formation.

The '165 patent relates to "voice only" systems and therefore does not teach tracking the supplemental channels which may be providing supplemental data to the MS separate from a traffic channel used for a voice conversation. By not tracking a Supplemental Code Channel, data may be lost when the communication path is temporarily severed during a soft handoff, or when a four way handoff occurs. The following example demonstrates the problem.

A four-way soft handoff occurs where the MS has three fingers available to track paths. Suppose four base stations are all in the Active Sector of the MS on an HDR call. The finger assignment algorithm will select the strongest paths from top three base stations to match up with the fingers since those are the cells indicating the strongest signals. If the fourth BS is the only station transmitting a Supplemental Channel, then the MS will not be demodulating the Supplemental Channel, resulting in an radio link protocol (RLP) resynchronization at the MS.

Data may also be lost or an interruption of communication may occur if the MS is in a handoff and the MS has Y fingers available to track paths, and the BS sectors that are transmitting supplemental channels are the $(Y+1)^{th}$ to last strongest pilots received by the MS. In other words, if the MS has for example 4 fingers available to track paths and the base stations transmitting on supplemental channels is the $5^{th}$ strongest pilot received by the MS, then the supplemental channel will not be demodulated and the information will not be communicated to the MS under the method taught in the '165 patent.

The '165 algorithm was designed for operation with voice calls. The '165 design assigned the fingers to as many cells as possible, and kept the best paths on those cells while preventing the fingers from being reassigned too often. The selection of paths for finger assignment in the '165 patent is made solely on how strongly an active set pilot is received; the number of Walsh channels dedicated to the mobile station on that pilot (e.g. HDR) is not a factor. Let us consider the following scenarios as illustration.

(1) In a two-way handoff situation, multiple paths may be in the path list formed by part 1 of the prior art algorithm from both cells. Since we have 3 fingers available for assignment for a HDR (MSM3.0), 2 will cover the best multipaths from both cells and the last finger will cover 1 multipath that's strongest from either the first or second cell. Now if the weaker of these cells transmits SCHs to the MS, the algorithm should assign 2 fingers to that cell and only 1 to the stronger. The prior art algorithm fails in this regard.

(2) In another case, let's introduce 2 cells with 2 sectors each. Sectors P1 and P2 are from cell 1, and sectors P3 and P4 are from cell 2. Assume that P4 is the weakest of all sectors. The prior art algorithm will cover both cells by assigning a finger to the strongest of P1 and P2 and another finger to P3. Since the weaker of P1 and P2 is received with a stronger signal strength than P4, the third finger will go to that sector. Therefore, P4 is left uncovered. If P4 is the only sector transmitting on the SCHs, the mobile will not demodulate any SCHs.

FIG. 1 illustrates the prior art algorithm for creating the path list. The first part of the algorithm as shown in FIG. 1 establishes a path vector obtained from the searcher engine after it has swept through the mobile station's Active Set ("Aset"). The algorithm insures that paths being tracked by the demodulating fingers are also included in this vector, while screening for duplicates between searcher and finger peaks. Once this list of paths is compiled, it is used in the subsequent steps of the finger assignment process.

The method begins (block 10) by clearing the list of paths (block 12). A first BS sector with which communication is established is set as the first sector under consideration for the searching process (block 14). The searcher element searches a window of time around the expected arrival time of signals from the sector under consideration (block 16). The three strongest local maxima from the search of the sector under consideration are determined (block 18). In this example, finding more than the three strongest is ineffectual because only three fingers are available for assignment and in no case would a finger be assigned to the fourth largest survey path from a single BS sector.

Each of the three maxima that has a signal strength that is stronger than a threshold value are added to the path list (block 21). If there are more sectors in the active set (block 22), the next sector in the active set is set for consideration (block 26) and the method continues to search a time window around the new sector under consideration (block 16) and the method proceeds as discussed above. If the sector under consideration is the last sector to be searched, the survey list is complete (block 22).

Having attained the set of survey paths, the method determines the lock/unlock state of the finger corresponding to the finger under consideration is checked (block 34). If the finger is unlocked the controller may de-assign the finger or it may label the finger "free" (block 50). In such a case no valid data exists to match to the survey paths. Action corresponding to the finger under consideration is complete and the method continues to determine whether there are more fingers (block 46). If yes, then "F" is set as the next finger (block 48) and it is determined whether F is in lock as outlined above (block 34).

If the finger under consideration is currently in lock (block 34), the method attempts to match the time offset of the finger to the analogous information in the list of survey paths (block 36). A local maximum is found within the search window based on the use of survey samples that are spaced 0.75 chips apart in time. If a smaller survey sample resolution is used, a single signal path would likely create more than one distinct peak. In such a system, the distinct peaks could be used to create a single local maximum for the purposes of finger assignment. In general, each finger matches with at least one survey path. In other words, if a path from a BS is strong enough to be demodulated, it should be detectable by the searcher element.

On occasion, the searcher element may miss a path and therefore not enter a survey path corresponding to a finger on the survey path list. The finger more accurately estimates the signal level and time offset of a path than the searcher element. Therefore the method assumes that the finger is accurate and that such a path does exist. Therefore if there is no survey path entry for a finger, a survey path entry corresponding to the finger is created (block 52) and added to the path list (block 55). Action corresponding to the finger under consideration is complete and the method determines whether there are more fingers for consideration (block 46). If there are more fingers to assign (block 46), then "F" is assigned as the next finger (block 48) under consideration and the method continues as outlined above to determine whether F is in lock and so forth (block 34).

If a survey path exists that corresponds to the finger under consideration, the method determines whether the finger under consideration is the first finger to match the particular survey path (block 38). If the finger under consideration is the first, action corresponding to the finger under consideration is complete and the method determines whether there are more fingers for consideration as set forth above (block 46).

If the finger under consideration is not the first finger to match the particular survey path, two fingers are demodulating substantially the same path. This scenario can be a common occurrence. Each finger tracks the signal to which it was originally assigned. Commonly two multipath signals over time merge into one path or nearly the same path. Block 38 identifies such a situation. If the finger under consideration is not the first finger to match a particular survey path, then it is determined which finger has the stronger signal level (block 40). If the finger under consideration has the stronger signal level, the previous finger having a path matching this same survey path is de-assigned or labeled free (block 42). If the finger under consideration is weaker than the previous path, the finger corresponding to the finger under consideration is de-assigned or labeled free (block 44). Action corresponding to the finger under consideration is complete.

If a finger exists that has not yet been considered (block 46), the next finger under consideration is selected (block 48) and the process is repeated for that finger (block 34, etc.). If the finger under consideration is the last finger to be considered, then the method of assigning finger assignment to assure cell diversity begins (block 54).

Having attained the set of survey paths and matched the fingers to the survey paths, the method proceeds to assign fingers using cell diversity. This portion of the algorithm is illustrated in FIG. 2. The survey path with the strongest signal level is taken under consideration and set as "P" (block 60). The cell containing P is set to "C" and the sector containing P is set as "S" (block 60).

The algorithm of FIG. 2 focuses on covering as many cells as possible while keeping the fingers assigned to the best paths from the cells. The algorithm continues by assigning the fingers to the strongest paths in the survey list. If a finger is assigned to the cell C under consideration (block 62), and then if more paths are on the path list (block 74), the method will cycle through the paths on the path list beginning with the strongest to the weakest (blocks 62, 74, 70) until a cell containing a survey path is found which doesn't have any fingers assigned to it (block 62). If the survey path under consideration is the last survey path to be considered, and the fingers are all assigned to cells (block 62), then a finger assignment to accomplish path diversity begins (block B).

FIG. 2 shows the next portion of the finger assignment algorithm. The second part of the algorithm takes the list of paths from above and ensures that the strongest cells detected by the Searcher have fingers assigned to them. Unless there are any free demodulating fingers available for assignment, this section of the algorithm makes sure that only 1 reassignment of fingers between cells is done per run through the algorithm.

FIG. 2 illustrates further that if no finger exists having a finger corresponding to the survey path under consideration, and if any fingers are unassigned (block 64), the unassigned finger is assigned to that path (block 72). Then if there are more paths in the path list (block 74), "P" is assigned as the next strongest path in the path list for consideration (block 70) and the cycle continues (block 62). After all the fingers have been assigned (block 64), then the method begins a process of insuring that there are not more than one finger demodulating each cell. The weakest finger "F" (block 65) is first evaluated to determine whether to reassign a finger. If there is another finger assigned to the weakest finger's cell (block 66), then the other finger is reassigned to the path under consideration (76) and the cycle begins again at FIG. 1 through connecting block A.

If there are no other fingers assigned to the weakest finger F's cell (block 66), and there are more fingers (block 69), "F" is assigned as the next weakest finger (block 67) and it is determined whether there are any other fingers assigned to F's cell (block 66), and so forth as described above. In this manner, the method insures that each cell only has a single finger demodulating it.

When there are no more fingers to assign (block 69), it is determined whether the weakest finger is at least 3 dB less than P (block 68). If the weakest finger is more than 3 dB weaker than P, then the finger corresponding to the finger for comparison is re-assigned to the survey path under consideration (block 76). This re-assignment is the sole re-assignment for this cycle and the cycle beings over at FIG. 1 (block A). The assignment involves assigning an unassigned finger, of one exists, to the particular survey path having a corresponding transmitter index that is different from every other transmitter index in the list of fingers.

Continuing at block 68, if the signal level of the weakest finger used for comparison is not at least 3 dB weaker than the signal level of the survey path under consideration, then the algorithm proceeds to the final portion which optimizes path diversity (block C), shown in FIG. 3.

Turning to FIG. 3, the third part of the algorithm only goes in effect if no reassignments between cells have been made in step 2 of the algorithm. In that case, this step of the algorithm focuses on assigning fingers to the best multi-paths of the cells covered in part 2. In FIG. 3, the strongest path in the path list is set as "P" and the cell containing P is set as "C", and the sector containing P is set as "S" (block 98). To maximize sector diversity, it is determined whether a finger is assigned to demodulate the path P (block 106). If yes, the method determines whether there are any more paths on the path list (block 104). If there is no finger assigned to P, it is determined whether any finger is free or unassigned (block 108). If an unassigned or free finger exists, the unassigned or free finger is assigned to P (block 102) and action corresponding to the survey path under consideration is complete and it is determined whether there are more paths on the path list (block 104).

From block 104, if there are more paths on the path list, the process continues for the next strongest survey path, which is assigned as "P" and assigns "C" as the cell containing P (block 100). If an additional survey path does not exist, the flow continues through connection block A to FIG. 1 to clear the list of survey paths and being the cycle again (block 12).

Returning to block 108, after the strongest paths are assigned fingers and there are no fingers remaining, then the algorithm insures that there is a single finger assigned to each cell. The weakest finger is assigned as "F" (block 110). It is then determined whether the finger F is assigned to cell C (block 112). If yes, then it is determined whether the finger F is weaker than P by more than 3 dB. If F is weaker than P by more than 3 dB, then F is reassigned to path P (block 120). If F is no weaker than P by more than 3 dB, then the cycle begins again through block A.

Returning to block 112, if F is not assigned to C, then it is determined whether there is another finger assigned to F's cell (block 122). If no, then if there are any more fingers to consider (block 124), "F" is assigned as the next weakest finger and the algorithm returns to block 112. If there is another finger assigned to F's cell (block 122), then it is determined whether F is weaker than P by more than 3 dB (block 118) and the algorithm proceeds as described above.

If a finger is re-assigned (block 120), the re-assignment is the sole re-assignment for this cycle and the flow continues though connection block A to the beginning of a new cycle on FIG. 1. The assignment involves assigning an unassigned finger, of one exists, to the particular survey path having a corresponding transmitter index that is different from every other transmitter index in the list of fingers. Both parts 2 and 3 of the current algorithm limit the total number of reassignments to 1 per run through, since fingers go out of lock and do not demodulate when taken off energy paths.

SUMMARY OF THE INVENTION

In order to address the problem of possibly losing supplemental channels in a soft handoff, the invention disclosed herein is proposed. The present invention insures that at least one finger will be assigned to a cell that is transmitting on supplemental channels, if one exists. If one or more fingers are already demodulating supplemental channels, then the finger assignment algorithm will proceed normally. The present invention provides an improved finger assignment algorithm over that shown in FIG. 1 by introducing an artificial bias into the received pilot signals from the base stations transmitting on supplemental channels.

The present invention comprises a method of assigning fingers in a wireless communication system comprising clearing a list of paths, choosing a sector for consideration from an active set of sectors, establishing a searcher window around the sector for consideration, and determining up to "n", or some predetermined number of local maxima stronger than a threshold value. If the sector under consideration is transmitting supplemental channels, the received signal estimate of the searcher window is artificially biased by a predetermined value and the maxima is added to the path list. The path list creating algorithm then continues to the next sector until all the active set sectors have been considered and the path list for this finger assignment cycle is created. The received signal estimate may be a signal strength value or a ratio (Ec/Io) between the pilot energy accumulated over on PN chip period (Ec) to the total power spectral density (Io) in the received bandwidth. The predetermined value used for biasing may be constant, variable or proportional to the number of supplemental channels being transmitted by the base station.

Next, the path list creating algorithm screens for duplicate paths between the searcher window and the finger peaks. This portion of the algorithm comprises choosing a finger for consideration, and if the finger is not presently in lock, de-assigning the finger from the path because the finger has wandered from its path. If the finger is presently in lock, the method comprises determining whether the path list contains a path corresponding to the finger. Typically, a path from the path list that is within ¾ chips of the chosen finger for consideration is considered "corresponding" to the finger, although this value may vary. If the path list does not contain a path within ¾ chips of the finger under consideration, then a path of equal strength to the path of the finger under consideration is created and it is determined whether the finger for consideration is demodulating supplemental channels.

If the finger under consideration is demodulating supplemental channels, then the method comprises adding a path to the survey list which corresponds to the finger, or which is equivalent to the finger's path under consideration, biased by a predetermine value, to the list of paths. If the finger under consideration is not demodulating supplemental channels, then the equivalent path is added to the path list without biasing. If there are more fingers for consideration, the next finger is chosen and the cycle begins again by determining whether the finger is presently in lock. After the path list has been created and the screening is accomplished, the method comprises executing the finger assignment algorithm to assign fingers to the paths in the path list wherein paths in the path list having supplemental channels are biased.

The present invention further comprises a wireless communication system comprising a mobile station, at least one base station and a control system. The control system creates a list of paths transmitted from the at least one base station. The control system creates the path list by biasing the paths entered onto the path list according to whether a path is from a sector which is transmitting supplemental channels. The biasing value may be a constant, variable, or proportional to the number of supplemental channels transmitted from that base station. For example, if a base station is sending data on 7 supplementary channels to the mobile station, the searcher Ec/Io estimate from that base station is multiplied by 7 (8.5 dB) and that value is inserted into the path list before executing the finger assignment algorithm. The control system further creates an equivalent path of equal strength to the path of the finger under consideration if the path list does not contain a path with a position within ¾ chips of the finger under consideration. If the finger is demodulating supplemental channels, then the equivalent path biased by a predetermined value is added to the path list and if the finger is not demodulating supplemental channels, then the control system adds the equivalent path to the path list without bias. A control system for operating the algorithm and methods illustrated by the flow charts is not shown in detail. Such control system is deployed in the MS. Implementing the method and algorithm disclosed and claimed herein by a control system would be understood by one of ordinary skill in the art.

BRIEF DESCRIPTION OF THE DRAWINGS

The features, object, and advantages of the present invention will become more apparent from the detailed description set forth below when taken in conjunction with the drawings in which.

DETAILED DESCRIPTION OF THE INVENTION

Figure 1:
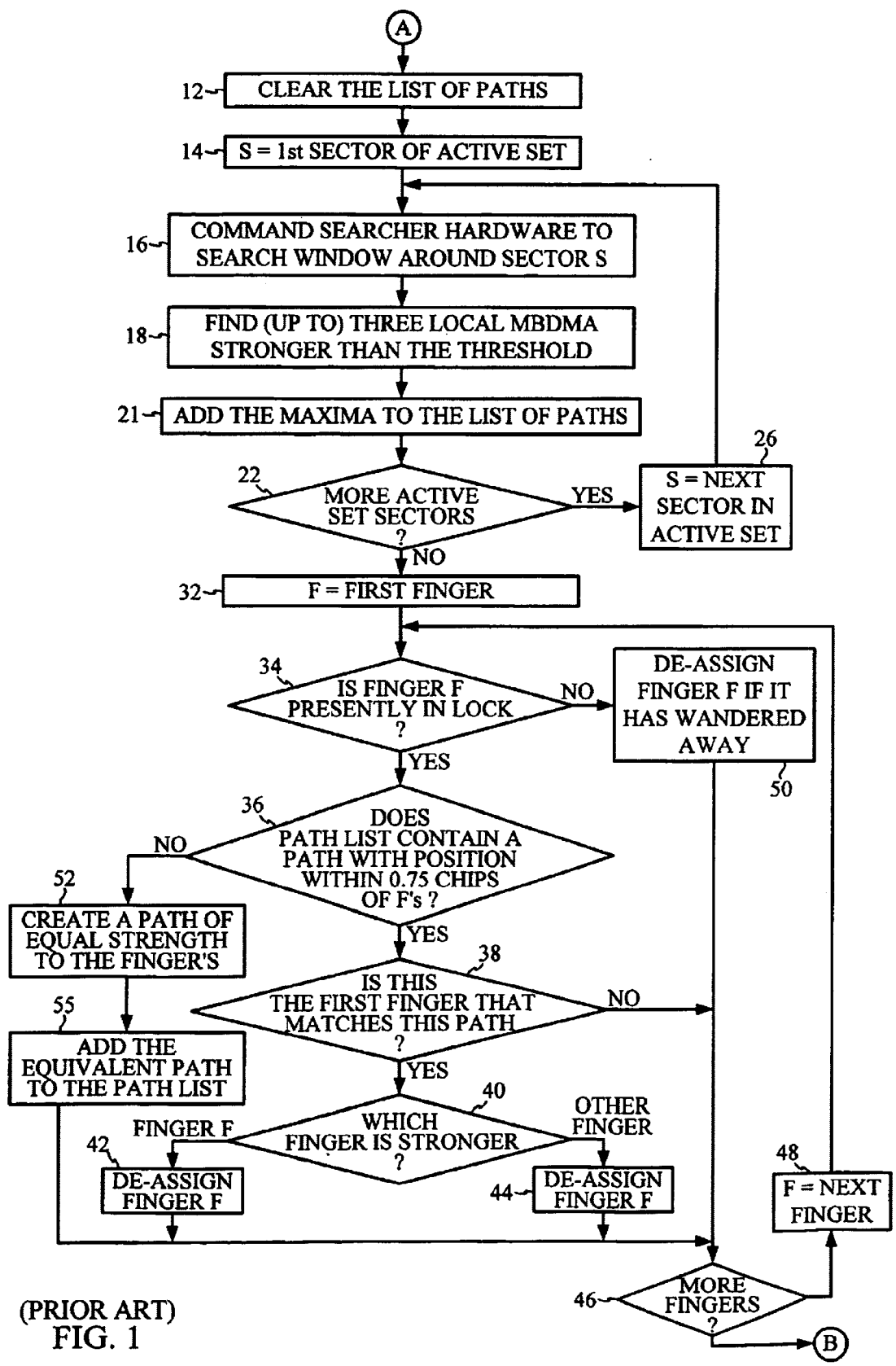
FIG. 1 is an illustration of the prior art finger assignment algorithm which matches fingers to paths.
Figure 2:
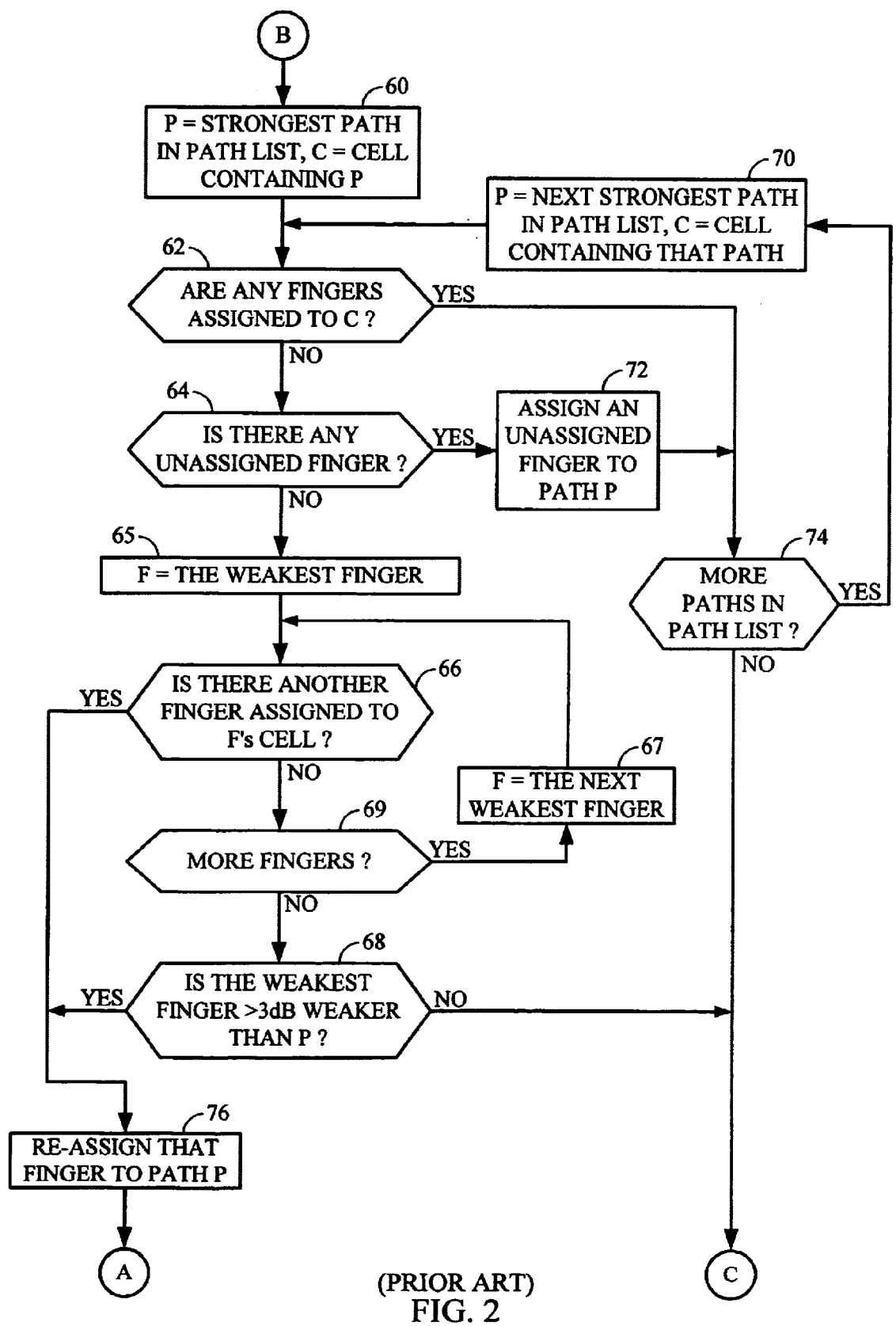
FIG. 2 is an illustration of the prior art finger assignment algorithm which maximizes cell diversity.
Figure 3:
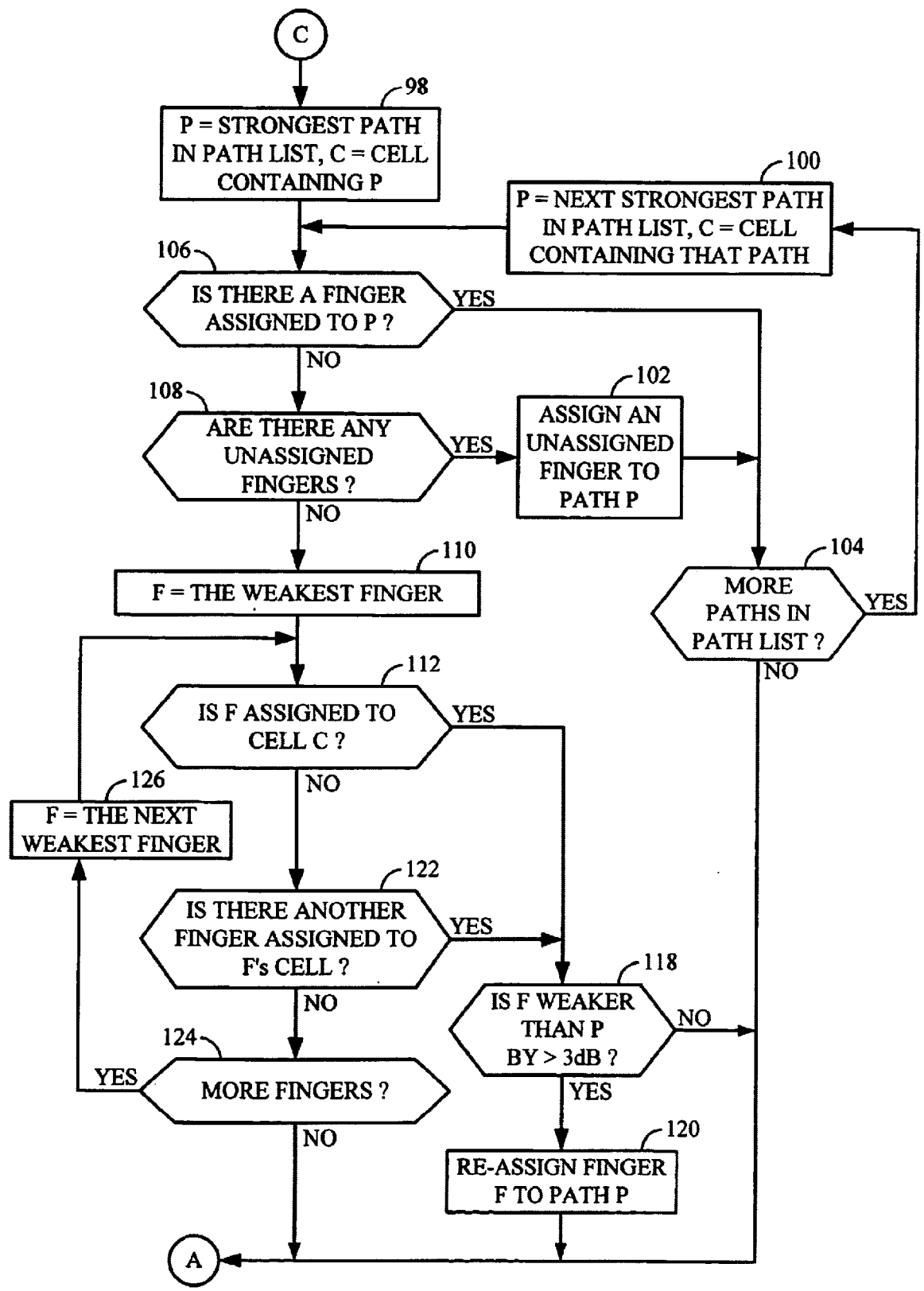
FIG. 3 is an illustration of the prior art finger assignment which maximizes path diversity.
Figure 4:
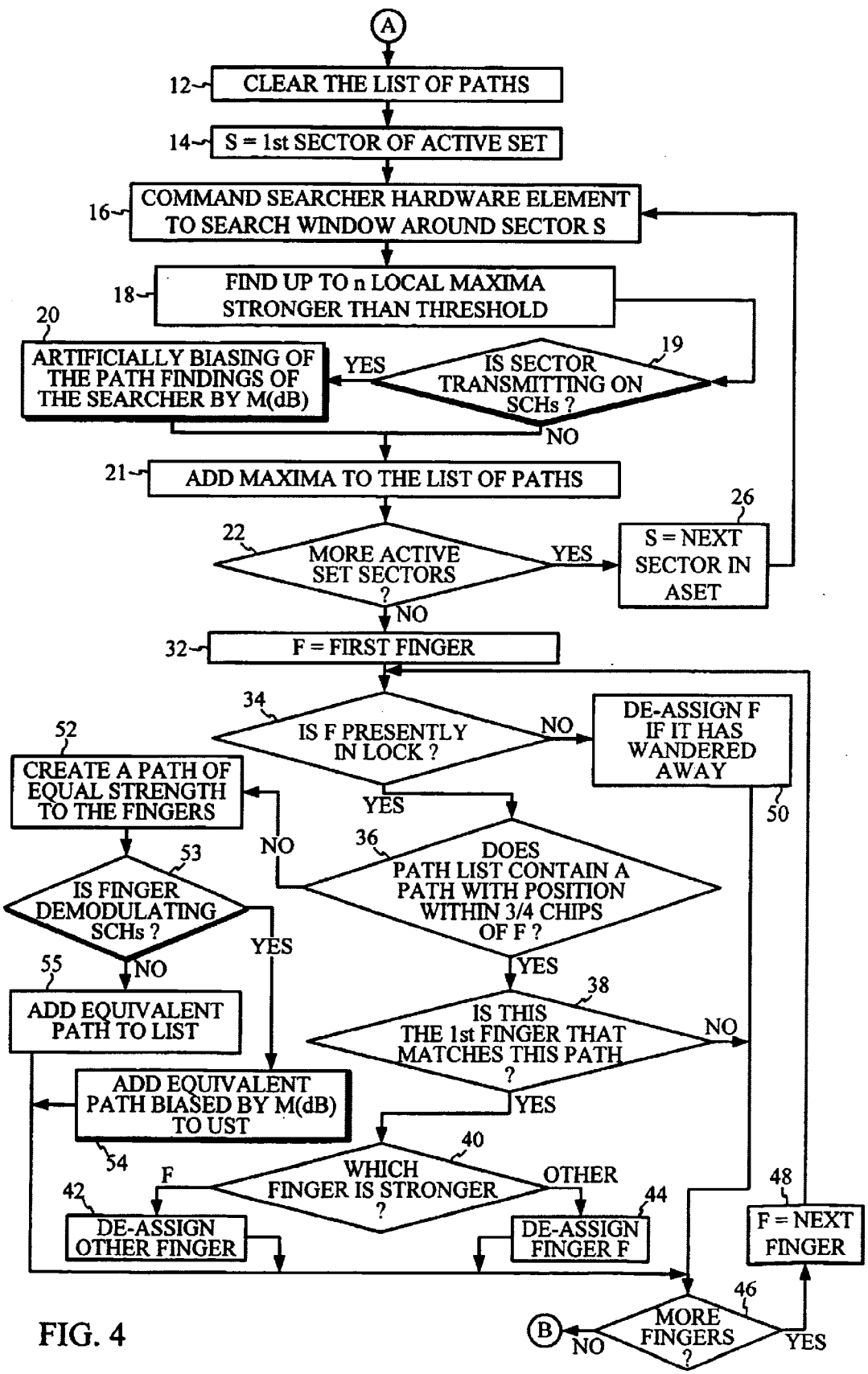
FIG. 4 illustrates the present invention wherein bias is introduced into the algorithm which matches fingers to paths.

FIG. 4 illustrates the preferred embodiment of the present invention. The method begins (block 10) by clearing the list of survey paths (block 12). A first BS sector with which communication is established is set as the first sector under consideration for the searching process (block 14). The searcher element searches a window of time around the expected arrival time of signals from the sector under consideration (block 16). The three strongest local maxima from the search of the sector under consideration are determined (block 18). It is contemplated that a number greater than or less than three may be used for choosing the local maxima.

Next, it is determined whether the sector transmitting the local maxima is transmitting on supplemental channels (block 19). If the sector is transmitting on supplemental channels, then the received energy signal estimate from that base station is biased by a constant value m (dB). The value m (dB) may also be proportional to the number of supplementary channels transmitted by that base station or may be variable based on other factors. As an example of when "m" is proportional to the number of supplementary channels transmitted by the base station, if a base station is sending data on 7 supplemental channels, the searcher Ec/Io estimate from that base station is multiplied by 7 (8.5 dB). Ec/Io is the ratio in dB between the pilot energy accumulated over on PN chip period (Ec) to the total power spectral density (Io) in the received bandwidth.

Each of the three maxima that has a signal strength that is stronger than a threshold value and those biased by "m" are added to the survey paths (block 21). If there are more sectors in the active set (block 22), the next sector in the active set is set for consideration (block 26) and the method continues to search a time window around the new sector under consideration (block 16) and the method proceeds as discussed above. If the sector under consideration is the last sector to be searched, the survey list is complete (block 22).

Having attained the set of survey paths, the method determines the lock/unlock state of the finger corresponding to the finger under consideration is checked (block 34). If the finger is unlocked the controller may de-assign the finger or it may label the finger "free" (block 50). In such a case no valid data exists to match to the survey paths. Action corresponding to the finger under consideration is complete and the method continues to determine whether there are more fingers (block 46). If yes, then "F" is set as the next finger (block 48) and it is determined whether F is in lock as outlined above (block 34).

If the finger under consideration is currently in lock (block 34), the method attempts to match the time offset of the finger to the analogous information in the list of survey paths (block 36). A local maximum is found within the search window based on the use of survey samples that are spaced 0.75 chips apart in time. If a smaller survey sample resolution is used, a single signal path would likely create more than one distinct peak. In such a system, the distinct peaks could be used to create a single local maximum for the purposes of finger assignment. In general, each finger matches with at least one survey path. In other words, if a path from a BS is strong enough to be demodulated, it should be detectable by the searcher element.

On occasion, the searcher element may miss a path and therefore not enter a survey path corresponding to a finger on the survey path list. The finger more accurately estimates the signal level and time offset of a path than the searcher element. Therefore the method assumes that the finger is accurate and that such a path does exist. Therefore if there is no survey path entry for a finger, a survey path entry corresponding to the finger is created (block 52). Next, it is determined whether the finger F is demodulating supplemental channels (block 53). If yes, then the equivalent path created (block 52) is biased by the value m (dB) (block 54), which as described above, may be constant, variable, or proportional to the number of supplemental channels transmitted by that base station or base station sector. The biased equivalent path is added to the path list (block 54). If F is not demodulating supplemental channels (block 53), then the equivalent path is added to the path list without the bias introduced (block 55). Action corresponding to the finger under consideration is complete and the method determines whether there are more fingers for consideration (block 46). If there are more fingers to assign (block 46), then "F" is assigned as the next finger (block 48) and the method continues as outlined above to determine whether F is in lock and so forth (block 34).

If a survey path exists that corresponds to the finger under consideration, the method determines whether the finger under consideration is the first finger to match the particular survey path (block 38). If the finger under consideration is the first, action corresponding to the finger under consideration is complete and the method determines whether there are more fingers for consideration as set forth above (block 46).

If the finger under consideration is not the first finger to match the particular survey path, two fingers are demodulating substantially the same path. This scenario can be a common occurrence. Each finger tracks the signal to which it was originally assigned. Commonly two multipath signals over time merge into one path or nearly the same path. Block 38 identifies such a situation. If the finger under consideration is not the first finger to match a particular survey path, then it is determined which finger has the stronger signal level (block 40). If the finger under consideration has the stronger signal level, the previous finger having a path matching this same survey path is de-assigned or labeled free (block 42). If the finger under consideration is weaker than the previous path, the finger corresponding to the finger under consideration is de-assigned or labeled free (block 44). Action corresponding to the finger under consideration is complete.

If a finger exists that has not yet been considered (block 46), the next finger under consideration is selected (block 48) and the process is repeated for that finger (block 34, etc.). If the finger under consideration is the last finger to be considered, then the method of assigning finger assignment to assure cell diversity begins (block B).

The modification to the path list creation algorithm described above biases the fingers towards base stations that are transmitting on supplemental channels, and allows the finger assignment algorithm to be executed in the normal manner.

Some examples of how the biasing technique disclosed herein improves the finger assignment algorithms follows.

The Finger Assignment Algorithms (FAA) disclosed herein is more suitable for IS-95 B High Data Rate calls. There are several areas where the algorithms for handling voice calls may be improved upon. First, an important issue is power control (PC). All MSM2.3+ have four demodulating fingers available for assignment to separate cells, but the combining block can handle only 3 separate power control (PC) sub-channels. So in the case of a four-way soft-handoff, the PC commands from one of the fingers is ignored. Possibly, the finger ignored may be demodulating the only cell sending down PC commands to the mobile station. Therefore, precaution needs to be taken at the S/W level to make sure 4 way soft-handoff does not occur. One way to do so is to assign the weakest finger to the null cell. This is equivalent to receiving PC ups in the case where all other cells send down commands. Since this finger would have been on the weakest cell anyway, this is not an unreasonable solution and would not unbalance the Reverse Link. Another method is to keep a running count of the number of cells demodulated by the fingers. Once the 3 strongest cells have been covered, the fourth finger can be available for demodulation of multi-path of one of the cells already covered. The latter solution is preferred because on average it increases the overall $E_b/N_t$ of the link. A preferred place to locate this count and limit the number of candidate cells to listen to is after gathering the path list. Then post processing is accomplished on that list to remove paths from the weakest cell and de-assign any fingers assigned to that cell. Some hysteresis needs to be implemented here to avert the situation where a demodulating finger may ping-pong between 2 cells.

Figure 5:
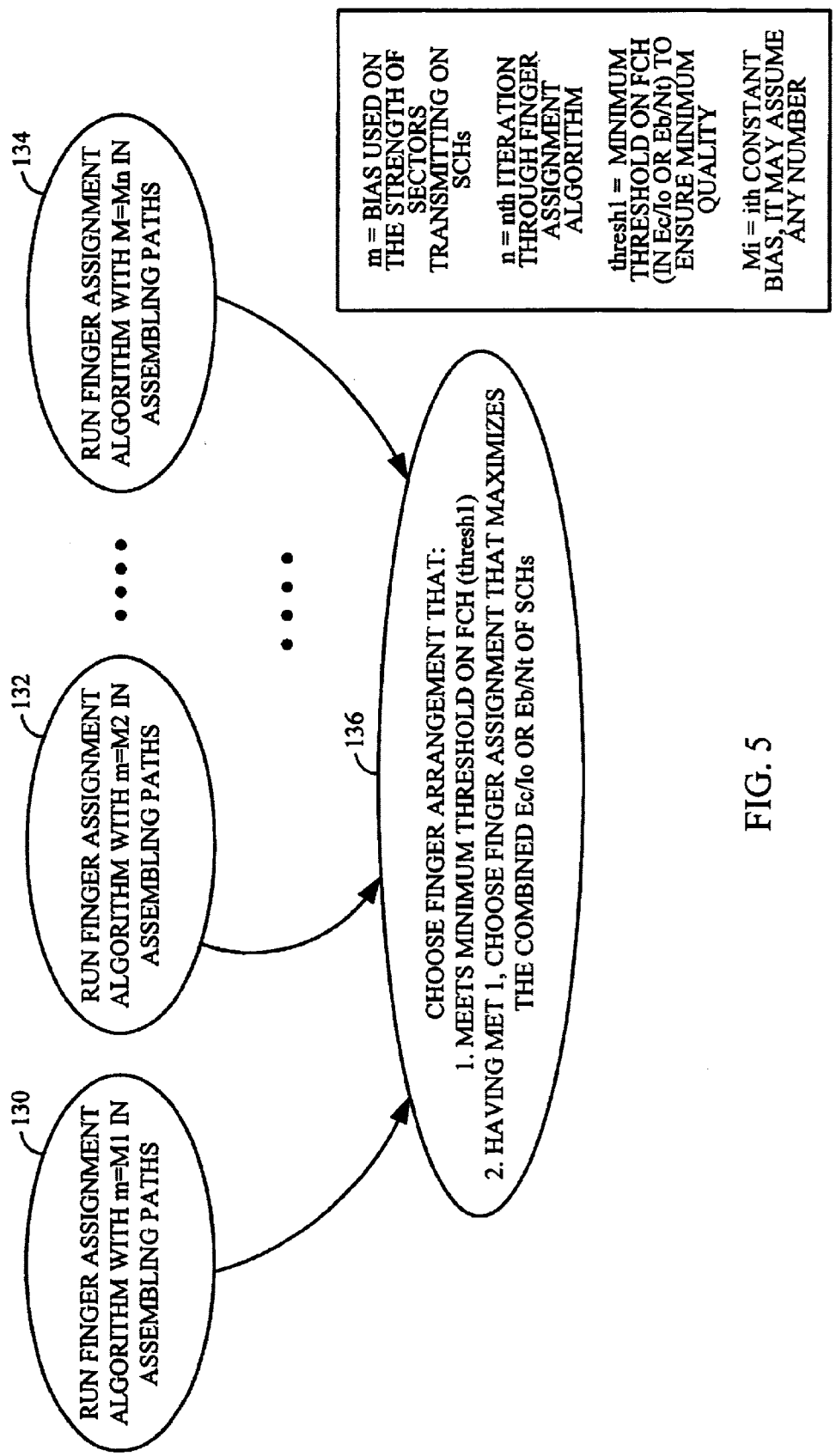
FIG. 5 illustrates biasing the paths in the path list at each iteration of the finger assignment algorithm.

FIG. 5 illustrates the finger assignment algorithm which is executed after the path list is created according to the algorithm of FIG. 4. First, the finger assignment algorithm is executed with m=M1 as the biasing value in assembling the path list (block 130). The value "m" is the bias used on the strength readings of the sectors transmitting on supplemental channels. Next, the finger assignment algorithm chooses a finger arrangement that will meet the minimum threshold value (thresh1) on the fundamental channel ("FCH"), and having met that value, will choose a finger assignment that will maximize the combined Ec/Io or Eb/Nt for the supplemental channels (block 136).

The value thresh1 corresponds to the minimum threshold on the FCH (in Ec/Io or Eb/Nt) to ensure a minimum quality.

The next the time the finger assignment algorithm is executed, m=M2 when assembling the path lists (block 132). The finger assignment is then executed again as discussed above for block 136. The finger assignment algorithm is run "n" times until it is run with m=Mn for assembling the path list (block 134) and the fingers are again assigned according to the path list created with biasing according to the present invention. The value of Mi (M1, M2 . . . Mn) may be a constant, may be variable, or may be proportional to some value such as the number of supplemental channels transmitted by a sector.

Figure 6:
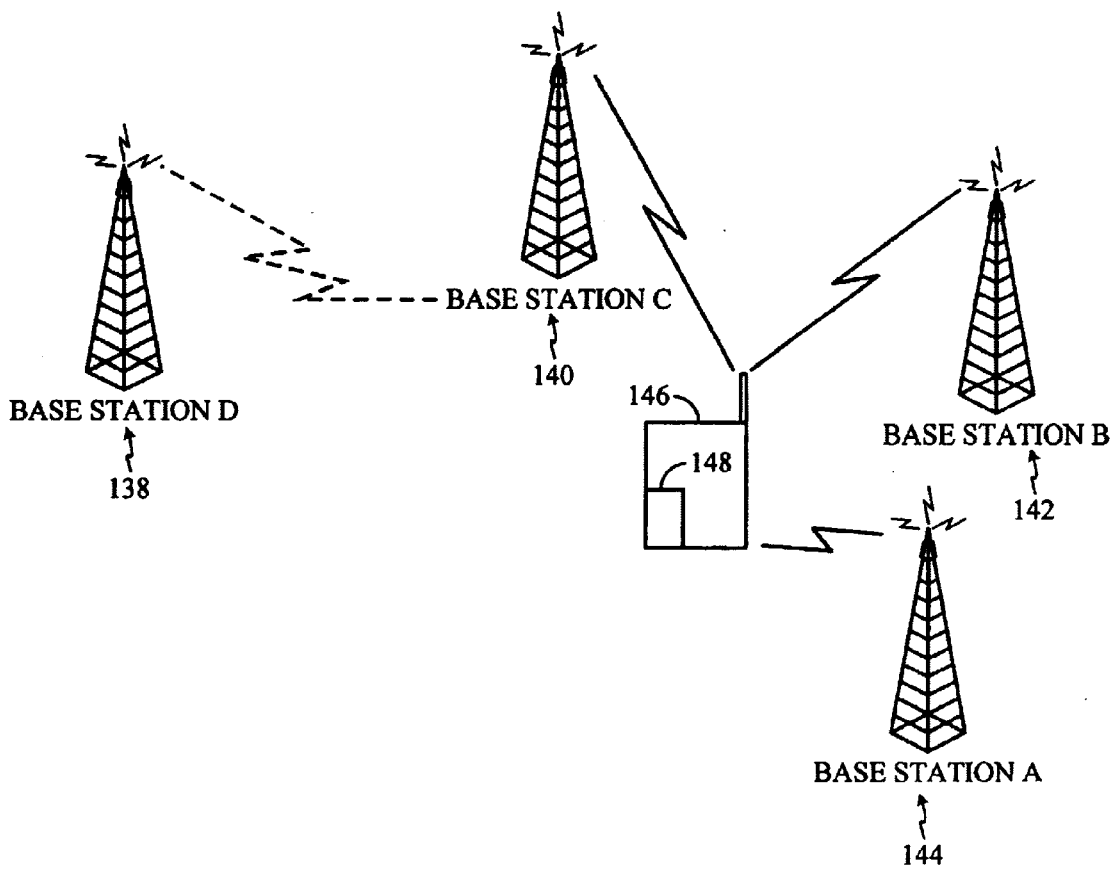
FIG. 6 illustrates a wireless communication system and control system.

FIG. 6 illustrates a wireless communication system comprising base station A 138, base station B 140, base station C 142 and base station D 144. A mobile station 146 includes a circuitry having a control system 148. The mobile station 146 control system 148 creates a path list and executes the finger assignment algorithm using the path list. The a control system 148 creates a path list for a sector associated with the one ore more base stations and biases the paths entered onto the path list according to whether a path is from the sector which is transmitting supplemental channels. The control system 148 also determines whether a sector is transmitting on supplemental channels, and if the sector is transmitting on supplemental channels, the control system 148 biases the signal by a predetermined value for that path. The control system further 148 creates a path to be associated with a finger under consideration if the path list does not contain a path associated with the finger under consideration, and the control system 148 biases the associated path by a predetermined value if the finger under consideration is demodulating supplemental channels and if the finger under consideration is not demodulating supplemental channels, then the control system 148 adds the associated path to the path list.

One of ordinary skill in the art will understand the necessary components used to make the control system 148 in order to practice the functions of the communication system disclosed and claimed herein.

Regarding power control, the results of Viterbi's study on other cell interference when a mobile is controlled by multiple cells is useful to understanding the benefits of the present invention. "Other Cell Interference in Cellular Power-Controlled CDMA" A J Viterbi, A M Viterbi and E. Ezhavi. *IEEE Transactions on Communications*, vol. 42, April, 1994. The paper concludes that there is little relative improvement in the reduction of other-cell interference generated by the mobile if it is power controlled by the 3 strongest cells instead of 2. The results of the Virberbi study are depicted in Table 1.

TABLE 1

Relative Other-Cell Interference Factor vs number of strongest power controlling cells. Propagation attenuation factor = 4

| Standard Deviation of log-normal shadowing | Nc = 1 | Nc = 2 | Nc = 3 | Nc-4 |
|---|---|---|---|---|
| 0 | 0.44 | 0.44 | 0.44 | 0.44 |
| 2 | 0.49 | 0.43 | 0.43 | 0.43 |
| 4 | 0.67 | 0.47 | 0.45 | 0.45 |
| 6 | 1.14 | 0.56 | 0.49 | 0.49 |
| 8[1] | 2.40 | 0.77 | 0.57 | 0.55 |
| 10 | 6.23 | 1.28 | 0.75 | 0.66 |
| 12 | 20.0 | 2.62 | 1.17 | 0.91 |

These findings suggest that an infinite bias towards cell diversity may not be necessary when assigning fingers, if a certain number of the strongest cells have been covered.

Given the right multi-path environment, it can be shown through simulation, that the $E_b/N_t$ of a cell is improved when 3 fingers are assigned to 2 cells, when a third cell is present, with the third finger assigned to the same cell as the first or second finger.

In order to take advantage of the benefits of IS-95B compliant networks and higher data rate calls, the present inventors propose using the FAA to weigh in its logic the number of Walsh channels assigned to the mobile. One way of doing this is to bias the received signal energy estimate of a base station by a constant or some figure proportional to the number of supplemental channels (SCHs) transmitted by that base station. For example, if a base station sending data on 7 SCHs to the mobile, we may multiply the search Ec/Io estimate from that base station by 7 (8.5 dB) and inserting that value in the path list before the finger assignment algorithm. The finger assignment algorithm would then be executed except the fingers will be biased towards base stations transmitting supplemental channels.

The benefits of this algorithm change are illustrated in the following. First, suppose the mobile station is in a 2 way soft handoff with 2 sectors. In this very common situation, a mobile station finds itself power controlled by 2 cells of which either one, or both cells transmit to the mobile on the SCHs. Table 2 illustrates the results.

TABLE 2

Configuration for 2 way handoff

| | |
|---|---|
| $E_c/I_{or}$ of First Pilot (P1), cell 1 | −7 dB |
| $E_c/I_{or}$ of Second Pilot (P2). Cell 2 | −7 dB |
| $I_{or1}/I_{oc}$ and $I_{or2}/I_{oc}$[2] | −2.3 dB and −4.3 dB respectively |
| Number of cells in Aset | 2 |
| Number of paths from each pilot | 2.5[3] |
| Rice factor in fading process | 0 |
| Vehicle Speed | 1.5 m/s (5.4 km/h) |
| Shadow fading correlation distance | 10 meters |
| # of chips coherently integrated | 512 chips |
| Size of hypothesis window | 60 chips |
| Number of Supplemental Channels | 7 |
| # of chips coherently integrated | 512 |
| Number of iteration through FAA | 10,000 |

Using the prior art algorithm, the following quality metrics are obtained.

TABLE 3

Results using the Prior Art Algorithm

| | P2 tx SCH | P1 tx SCHs | Both tx SCHs |
|---|---|---|---|
| Fund. Channel <Eb/N$_t$> | 10.02 dB | 10.02 dB | 10.02 dB |
| Supp. Channel <Eb/N$_t$> | 4.98 dB | 8.91 dB | 10.39 dB |
| Effective <Eb/N$_t$> | 6.03 dB | 9.06 dB | 10.34 dB |
| # of reassign btw cells | 1632 | 1632 | 1632 |
| # of reassign btw mpaths: | 3868 | 3868 | 3868 |
| % of runs with no SCHs | 0 | 0 | 0 |
| Avg. # of cells demodulated | 2 | 2 | 2 |

As is illustrated by the results, if only the weaker of the two sectors (P2) is transmitting on the SCHs to the mobile station, then relatively, the <$E_b/N_t$> of the SCHs is much lower than the <$E_b/N_t$> of the fundamental channel—FCH.

According to the biasing technique of the present invention, scaling the energies measured by the searcher of a particular pilot by a weighting factor improves the system. For the simulation results, if a sector is transmitting on the SCHs its received Ec/Io is biased by 5 dB. Table 4 illustrates the results of biasing the SCHs by 5 dB.

TABLE 4

Results According to the Algorithm of the Present Invention

|  | P2 tx SCHs | P1 tx SCHs | Both tx SCHs |
|---|---|---|---|
| FCH $<E_b/N_t>$ | 9.76 dB | 9.96 dB | 10.01 dB |
| SCH $<E_b/N_t>$ | 5.95 dB | 9.01 dB | 10.38 dB |
| Effective $<E_b/N_t>$ | 6.65 dB | 9.14 dB | 10.34 dB |
| FCH $<E_b/N_t>$ hit by using new alg vs current | 0.33 dB | 0.07 dB | 0 dB |
| # of reassignments btw cells | 3105 | 90 | 1640 |
| # of reassignments btw mpaths | 2505 | 4783 | 3879 |
| % of runs with no SCHs | 0 | 0 | 0 |
| Avg # of cells demodulated | 2 | 2 | 2 |

Using the weighting factor, it can be seen that the SCH $<E_b/N_t>$ improves by about 1 dB if the weaker of the base stations is the only one transmitting on the SCHs. One of the advantages of the present invention is that if both base stations are transmitting supplemental channels, then the modified algorithm behaves similar to the prior art algorithm, with only a tiny increase in the number of reassignments. Therefore, when there is no need to bias the paths in the path list towards a particular base station because it is the only one transmitting supplemental channels, the algorithm of the present invention only presents a tiny increase in the number of reassignments and preserves the advantages and objects of the prior art. Also, the FCH $<E_b/N_t>$ only drops slightly using the algorithm of the present invention when the new algorithm is used in all cases.

Suppose next that the MS is in a two-way handoff with four sectors. In this situation, we have 2 cells in the active set of the MS. From each cell, suppose there are 2 sectors for a total of 4. The following configuration was used to gather simulation results. The same weighting factor of 5 dB is used the modified algorithm. The results for this simulation are shown in Table 5.

TABLE 5

Configuration for 2 way handoff According to the Present Invention

| | |
|---|---|
| $E_c/I_{or}$ of First Pilot (P1), cell 1 | −7 dB |
| $E_c/I_{or}$ of Second Pilot (P2), cell 2 | −7 dB |
| $E_c/I_{or}$ of Third Pilot (P3), cell 1 | −7 dB |
| $E_c/I_{or}$ of Fourth Pilot (P4), cell 2 | −7 dB |
| $I_{or1}/I_{oc}$, $I_{or2}/I_{oc}$, $I_{or3}/I_{oc}$ and $I_{or4}/I_{oc}$ | −4.3, −4.3 −8.5 and −8.5 respectively |
| Number of cells in Aset | 2 |
| Number of paths from each pilot | 2 |
| Rice factor in fading process | 0 |
| Vehicle Speed | 1.5 m/s (5.4 km/h) |
| Shadow fading correlation distance | 10 meters |
| # of chips coherently integrated | 512 chips |
| Size of hypothesis window for searcher | 60 chips |
| Number of Supplemental Channels | 7 |
| # of chips coherently integrated | 512 |
| Number of iterations through FAA | 10,000 |

A comparison of the results from the prior art algorithm (Table 6) and the algorithm of the present invention (Table 7) are depicted below.

TABLE 6

Results of Prior Art Algorithm

|  | P3 & P4 tx SCHs | P1 & P2 Tx SCHs | P1 tx SCHs | P4 tx SCHs | P1 + P4 tx SCHs |
|---|---|---|---|---|---|
| Fund. Channel $<E_b/N_t>$ | 10.62 dB | 10.62 dB | 10.62 dB | 10.62 dB | 10.62 dB |
| Supp. Channel $<E_b/N_t>$ | 1.82 dB | 10.43 dB | 7.42 dB | −1.9 dB | 7.98 dB |
| Effective $<E_b/N_t>$ | 4.43 dB | 10.45 dB | 7.98 dB | 3.23 dB | 7.41 dB |
| # of reassign btw cells | 3702 | 3702 | 3702 | 3702 | 3702 |
| # of reassign btw mpaths: | 3785 | 3785 | 3785 | 3785 | 3785 |
| % of runs with no SCHs | 57.76 | 0.0005 | 0.59 | 77.22 | 0.424 |
| Avg # of cells demodulated | 2 | 2 | 2 | 2 | 2 |

TABLE 7

Results of Algorithm of the Present Invention

|  | P3 & P4 tx SCHs | P1 & P2 Tx SCHs | P1 tx SCHs | P4 tx SCHs | P1 = P4 tx supps |
|---|---|---|---|---|---|
| Fund. Channel $<E_b/N_t>$ | 9.45 dB | 10.53 dB | 10.42 dB | 10.01 dB | 10.01 dB |
| Supp. Channel $<E_b/N_t>$ | 6.88 dB | 10.86 dB | 8.32 dB | 4.28 dB | 9.45 dB |
| Effective $<E_b/N_t>$ | 7.29 dB | 10.82 dB | 8.64 dB | 5.56 dB | 9.52 dB |
| FCH $<E_b/N_t>$ hit by using new instead of curr alg | 0.93 | 0.26 | 0.34 | 0.566 dB | 0.7 dB |
| # of reassign btw cells | 3538 | 3567 | 1419 | 2308 | 2790 |
| # of reassign btw mpaths: | 4455 | 1943 | 3369 | 4949 | 3478 |
| % of runs with no SCHs | 0.069 | 0 | 0.0003 | 0.794 | 0.00001 |
| Avg # of cells demodulated | 2 | 2 | 2 | 2 | 2 |

This handoff scenario creates the most dramatic difference in performance between the two algorithms. Clearly, the algorithm of the present invention performs much better in terms SCH and effective $<E_b/N_t>$, gaining 2 to 3 dB in some scenarios. Also, the number of instances where the prior art algorithm did not cover sectors with SCHs is significantly reduced here. No hit is taken for PC with the changes since both cells are always demodulated as well. And finally, the number of finger re-assignments in the algorithm of the present invention tracks that of the prior art algorithm and is even better in most cases.

Next, suppose the MS is in a two-way soft handoff with three sectors. In this scenario, there are three pilots in the active set of the mobile. Two of them belong to the same cell. The same algorithm according to the present invention is applied with the amplification factor being 5 dB. The data from the simulation are as follows in Tables 8, 9 and 10. Table 8 provides the parameters and configuration used for the simulation. Table 9 is the prior art algorithm results and Table 10 tabulates the results for the biasing algorithm of the present invention.

TABLE 8

Simulation Configuration

| | |
|---|---|
| $E_c/I_{or}$ of First Pilot (P1), cell 1 | −7 dB |
| $E_c/I_{or}$ of Second Pilot (P2), cell 2 | −7 dB |
| $E_c/I_{or}$ of Third Pilot (P3), cell 1 | −7 dB |
| $E_c/I_{or}$ of Fourth Pilot (P4), cell 2 | −7 dB |
| $I_{or1}/I_{oc}$, $I_{or2}/I_{oc}$, $I_{or3}/I_{oc}$ and $I_{or4}/I_{oc}$ | −4.3, −4.3, −6.5 dB respectively |
| Number of cells in Aset | 2 |
| Number of paths from each pilot | 3 |
| Vehicle Speed | 1.5 m/s (5.4 km/h) |
| Rice factor in fading process | 0 |
| Shadow fading correlation distance | 10 meters |
| # of chips coherently integrated | 512 chips |
| Size of hypothesis window for searcher | 60 chips |
| Number of Supplemental Channels | 7 |
| # of chips coherently integrated | 512 |
| Number of iterations through FAA | 10,000 |

TABLE 9

Results of Prior Art Algorithm

| | P2 & P3 tx SCHs | P1 & P2 tx SCHs | P1 tx SCHs | P4 tx SCHs |
|---|---|---|---|---|
| Fund. Channel $<E_b/N_t>$ | 9.65 | 9.65 | 9.65 | 9.65 |
| Supp. Channel $<E_b/N_t>$ | 8.02 | 8.77 | 5.69 | 4.03 |
| Effective $<E_b/N_t>$ | 8.28 | 8.89 | 6.47 | 5.27 |
| # of reassign btw cells | 1391 | 1391 | 1391 | 1391 |
| # of reassign btw mpaths: | 6136 | 6136 | 6136 | 6136 |
| % of runs with no SCHs | 0 | 0 | 21.66 | 0 |
| Avg # of cells demodulated | 2 | 2 | 2 | 2 |

TABLE 10

Results of Algorithm of the Present Invention

| | P2 & P3 tx SCHs | P1 & P2 tx SCHs | P1 tx SCHs | P3 tx SCHs |
|---|---|---|---|---|
| Fund. Channel $<E_b/N_t>$ | 9.17 | 9.60 | 9.13 | 9.22 |
| Supp. Channel $<E_b/N_t>$ | 9.26 | 8.93 | 7.55 | 5.87 |
| Effective $<E_b/N_t>$ | 9.25 | 9.02 | 7.76 | 6.46 |
| FCH $<E_b/N_t>$ hit by using new instead of curr alg | 0.6 | 0.09 | 0.66 | 0.52 |
| # of reassign btw cells | 2899 | 16 | 186 | 4604 |
| # of reassign btw mpaths: | 3970 | 6792 | 4926 | 2731 |
| % of runs with no SCHs | 0 | 0 | 0.0013 | 0 |
| Avg # of cells demodulated | 2 | 2 | 2 | 2 |

From the above results it can be seen that the algorithm of the present invention provides a better solution with respect to the SCH and effective $<E_b/N_t>$ with little sacrifice of the $<E_b/N_t>$ of the FCH. The total number of reassignments is again comparable to the prior art. With P1 supporting the SCHS, the percentage of iterations through the FAA with no fingers assigned to P1 is reduced dramatically.

These examples illustrate the advantages of the algorithm of the present invention which performs significantly better than the prior art. The modifications can be implemented on top of the prior art algorithm. A significant benefit is that when communicating a voice call only, the algorithm of the present invention retains the same benefits of the prior art. The same holds true if all sectors in the Aset of the mobile transmit on the SCHs.

The algorithm for HDR calls as disclosed herein abides by the following rules. The algorithm (1) seeks to cover up to 3 cells, (2) should keep the number of finger re-assignments to a minimum, and (3) seeks to maximize the effective $<E_b/N_t>$ of a call and not just the FCH $<E_b/N_t>$. The third benefit is met by introducing a weighting factor on sectors carrying SCHs.

The weight factor may be made dependent on the number of SCHs the mobile receives as mentioned before. For example, if there is only one SCH dedicated to the mobile, the bias may be reduced to 3 dB from 5. This case produced better results than the current algorithm in terms of effective $<E_b/N_t>$, but in some scenarios, the bias is not enough to drive the number of instances the FAS does not allocate fingers to sectors with SCHs.

Also based on the finding above, the following algorithm is proposed as a modification of the finger assignment algorithm: (1) Run the finger assignment algorithm and calculate the FCH Eb/Nt or Ec/Io; (2) if Ec/Io<threshold go to step 3, if not, finish; (3) introduce bias on sectors with SCHs, run finger assignment algorithm and assign fingers, and compute FCH Eb/Nt or Ec/Io; (4) if FCH Ec/Io<threshold assign fingers as in Step 1 and finish, if not, go to (5); (5) perform finger assignment of step 3 and finish.

From the examples presented herein, it may seem that steps 1 and 2 and the FCH Ec/Io threshold are unnecessary. But there may be some field scenarios where a finger assignment with the algorithm disclosed herein will reduce the FCH Ec/Io drastically, losing a call. Therefore, steps 1 and 2 and the threshold are added to overcome this possible difficulty.

The invention disclosed herein illustrates that the prior art algorithm is inadequate for HDR use. The present invention provides a way to modify the prior art yet retain its most valuable properties: limiting the number of reassignments and covering as many cells as possible. It has also been shown that using a weighting factor on sectors with SCHs, the effective $<E_b/N_t>$ can be considerably improved with only a slight decrease in FCH $<E_b/N_t>$.

The scope of the present invention should be determined by the appended claims and their legal equivalents, rather than by the examples given.

We claim:

1. In a wireless communication system, a method of creating a path list for finger assignment comprising:
   choosing a base station sector for consideration;
   receiving a signal from said sector;
   estimating a (Ec/Io) of the received signal;
   if said sector is transmitting a supplemental channel, biasing the (Ec/Io) of the received signal by a predetermined value; and
   adding said biased Ec/Io of the received signal to said path list.

2. The method of claim 1, further comprising clearing the list of paths before choosing a base station sector for consideration.

3. The method of claim 2, further comprising commanding a searcher window to search around said sector for consideration.

4. The method of claim 3, further comprising finding a predetermined number of local maxima from said sector stronger than a threshold value.

5. The method of claim 1, further comprising adding said Ec/Io of the received signal to said path list without bias if said sector is not transmitting on supplemental channels.

6. The method of claim 5, further comprising choosing the next sector in the active set after adding said biased or said unbiased Ec/Io of the received signal to the path list and if there are more sectors in the active set to be considered.

7. The method of claim 1, wherein biasing the received signal further comprises biasing with a constant.

8. The method of claim 1, wherein biasing the Ec/Io of the received signal comprises biasing with a variable.

9. The method of claim 1, wherein biasing the Ec/Io of the received signal comprises biasing using a value proportional to the number of supplemental channels transmitted by said sector.

10. In a wireless communication system, a method of creating a path list for finger assignment comprising:
    choosing a base station sector for consideration;
    receiving a signal from said sector;
    estimating a Ec/Io of the received signal;
    if said sector is transmitting a supplemental channel, biasing the Ec/Io of the received signal by a predetermined value and adding said biased Ec/Io of the received signal to said path list;
    choosing a finger for consideration;
    if the path list does not contain a path corresponding to said chosen finger, creating a path corresponding to said chosen finger and determining whether said chosen finger is demodulating a supplemental channel; and
    if said chosen finger is demodulating a supplemental channel, biasing the Ec/Io of said equivalent path and adding the Ec/Io of said biased equivalent path to said path list.

11. The method of claim 10, further comprising if said chosen finger is not demodulating a supplemental channel, adding the Ec/Io of the equivalent path to the path list without bias; and
    if there are more fingers for consideration after adding said equivalent path to the path list with or without bias, choosing a next finger for consideration.

12. The method of claim 10, wherein said biasing the received signal and biasing said equivalent path are accomplished by using a constant value.

13. The method of claim 10, wherein said biasing the received signal and biasing said equivalent path are accomplished by using a variable value.

14. The method of claim 10, wherein said biasing the received signal and biasing said equivalent path are accomplished by using a value proportional to the number of supplemental channels being transmitted by said base station sector.

15. The method of claim 10, further comprising clearing a list of paths before choosing a base station sector for consideration;
    establishing a searcher window around said base station sector for consideration; and
    determining up to a predetermined number of local maxima stronger than a threshold value.

16. The method of claim 15, further comprising:
    after biasing the Ec/Io of the received signal for sectors transmitting on supplemental channels, adding the predetermined number of local maxima to the path list and if there are more sectors in the active set to be considered, choosing a next sector for consideration from the active set.

17. The method of claim 16, further comprising:
    if said chosen finger is not presently in lock, de-assigning said chosen finger from its associated path;
    if said chosen finger is presently in lock, determining whether the path list contains a path corresponding to said chosen finger;
    if the finger under consideration is not demodulating supplemental channels, adding the Ec/Io of the equivalent path to the path list without bias; and
    if there are more fingers for consideration after adding the Ec/Io of said equivalent path or said biased equivalent path to said path list, choosing a next finger for consideration.

18. A method of assigning fingers to paths, comprising:
    choosing a base station sector for consideration;
    receiving a signal from said sector;
    estimating a Ec/Io of the received signal;
    if said sector is transmitting supplemental channels, biasing the Ec/Io of the received signal; and
    adding said biased Ec/Io of the received signal to said path list;
    choosing a finger for consideration;
    if the path list does not contain a path corresponding to said chosen finger, creating a path corresponding to said chosen finger and determining whether said chosen finger is demodulating supplemental channels;

if said chosen finger is demodulating a supplemental channel, biasing said Ec/Io of the equivalent path and adding said biased Ec/Io of the equivalent path to said path list; and executing a finger assignment algorithm to assign fingers to the paths in the path list wherein paths in the path list having supplemental channels are biased.

19. The method of claim 18, wherein said biasing the received signal and biasing said equivalent path are accomplished by using a constant value.

20. The method of claim 18, wherein said biasing the received signal and biasing said equivalent path are accomplished by using a variable value.

21. The method of claim 18, wherein said biasing the received signal and biasing said equivalent path are accomplished by using a value proportional to the number of supplemental channels being transmitted by said base station sector.

22. The method of claim 18 wherein executing said finger assignment algorithm comprises assigning fingers with a cell diversity priority and then assigning fingers with a path diversity priority.

23. The method of claim 18, further comprising:

clearing a list of paths before choosing a sector for consideration;

establishing a searcher window around said sector for consideration;

determining up to predetermined number of local maxima stronger than a threshold value;

adding said maxima to said path list;

if there are more sectors in the active set to be considered after adding said maxima to said path list, choosing a next sector for consideration;

if said chosen finger is not presently in lock, de-assigning said chosen finger from its path;

if said chosen finger is presently in lock, determining whether the path list contains a path associated with said chosen finger;

if said chosen finger is not demodulating supplemental channels, adding said equivalent path to the path list without bias; and if there are more fingers for consideration, choosing a next finger for consideration.

24. A method of assigning fingers comprising:

determining a forward channel signal strength;

if said forward channel signal strength determination is less than a first threshold value, introducing bias into sectors transmitting supplemental channels and creating a path list using said biased sectors;

assigning fingers to the paths in the path list; and if the sector forward channel signal strength is less than a second threshold value, then assigning a finger to said sector.

25. The method of claim 24, wherein determining a forward channel signal strength comprises determining the ratio between the pilot energy accumulated over on PN chip period to the total power spectral density in the received bandwidth.

26. A method of assigning fingers in a wireless communication system comprising:

creating a path list by:

choosing a set of forward channel signals that are stronger than a threshold value;

biasing the strength of the forward channel signals from sectors supporting supplemental channels by a predetermined value; and assigning fingers to the paths in the path list so as to maximize the combined Ec/Io or Eb/Nt of the supplemental channels.

27. The method of claim 26, wherein biasing the strength of the forward channel comprises using a predetermined value based on how many iterations of the finger assignment method.

28. The method of claim 26, wherein biasing the strength of the forward channel comprises using a predetermined value which is proportional to the number of supplemental channels transmitted by that base station.

29. The method of claim 26, wherein biasing the strength of the forward channel comprises using a predetermined value which is a constant value for each iteration of the finger assignment algorithm.

30. The method of claim 26, wherein choosing a set of forward channel signals that are stronger threshold value comprises using a threshold that is the minimum threshold on the fundamental channel to ensure a minimum quality of communication.

31. The method of claim 26, wherein biasing the strength of the forward channel signal comprises biasing the received signal energy estimate of a base station.

32. The method of claim 26, further comprising choosing a finger assignment that will meet a minimum threshold value on the fundamental channel, and if the minimum threshold value is met, choosing a finger assignment that maximizes a combined Ec/Io or Eb/Nt for the supplemental channels.

33. In a wireless communication system, a method of creating a path list for finger assignment comprising:

choosing a base station sector for consideration;

receiving a signal from said sector;

estimating a strength of the received signal;

if the sector is transmitting a supplemental channel, biasing the estimated strength of the received signal by a predetermined value; and adding the biased estimated strength of the received signal to the path list.

34. In a wireless communication system, a method for finger assignment comprising:

receiving signals from base station sectors;

estimating a strength of each of the received signals;

if one of the signals is from a base station sector transmitting a supplemental channel, biasing the estimated strength of the received signal by a predetermined value and adding the biased estimated strength of the received signal to a path list;

if one of the signals is from a base station sector not transmitting a supplemental channel, adding the estimated strength of the received signal without bias to the path list;

choosing a finger for consideration; and assigning the finger to one of signals in the path list based on the estimated strengths of the signals listed in the path list.

* * * * *